United States Patent

Murazaki et al.

[11] Patent Number: 5,859,496
[45] Date of Patent: Jan. 12, 1999

[54] LAMP CONTAINING LONG DECAY PHOSPHOR

[75] Inventors: Yoshinori Murazaki, Komatsushima; Keiji Ichinomiya, Anan, both of Japan

[73] Assignee: Nichia Chemical Industries, Ltd., Tokushima, Japan

[21] Appl. No.: 644,418

[22] Filed: May 10, 1996

[30] Foreign Application Priority Data

May 29, 1995 [JP] Japan .................................. 7-130609
Mar. 11, 1996 [JP] Japan .................................. 8-052968

[51] Int. Cl.$^6$ .............................. H01J 1/62; H01J 63/04; H01J 17/16; H01J 61/35
[52] U.S. Cl. ........................... 313/485; 313/487; 313/635
[58] Field of Search ..................... 252/301.4 R, 301.6 R; 313/485–87, 634, 483, 490–93, 635

[56] References Cited

U.S. PATENT DOCUMENTS

| | | |
|---|---|---|
| 4,353,808 | 10/1982 | Tanimizu et al. ................. 252/301.4 P |
| 4,487,533 | 12/1984 | Hoffman . |
| 5,376,303 | 12/1994 | Royce et al. . |
| 5,424,006 | 6/1995 | Murayama et al. . |

FOREIGN PATENT DOCUMENTS

| | | |
|---|---|---|
| 0418902 | 3/1991 | European Pat. Off. . |
| 0529956 | 3/1993 | European Pat. Off. . |
| 0622440 | 11/1994 | European Pat. Off. . |
| 0697453 | 2/1996 | European Pat. Off. . |
| 0710709 | 5/1996 | European Pat. Off. . |
| 58-121088 | 7/1983 | Japan . |
| 1458700 | 12/1976 | United Kingdom . |
| 1483243 | 8/1977 | United Kingdom . |
| 2142775 | 1/1985 | United Kingdom . |

OTHER PUBLICATIONS

*Database WPI*, Section Ch, Week 9651, Derwent Publications Ltd., London, GB; Class L03, AN 96–515273, XP002027137 & JP 08 269 448 A (Nichia Kagaku Kogyo KK) 15 Oct. 1996 *abstract*.

*Patent Abstracts of Japan*, vol. 00, No. 0 & JP 08 073845 A (Nichia Chem Ind. Ltd) *abstract* *p. 2*.

*Patent Abstracts of Japan*, vol. 013, No. 313 (C–618), 17 Jul. 1989 & JP 01 096283 A (Toshiba Corp), 14 Apr. 1989, *abstract*.

Primary Examiner—Sandra O'Shea
Assistant Examiner—Mack Haynes
Attorney, Agent, or Firm—Wenderoth, Lind & Ponack, L.L.P.

[57] ABSTRACT

An afterglow lamp has a light emitting section for converting electric energy to optical energy. A fluorescent layer is excited to emit-light by the light emitting section and is represented by the general formula $(M_{1-p-q}, Eu_p Q_q)O \cdot n(Al_{1-m}B_m)_2O_3 \cdot kP_2O_5 \cdot \alpha X$. The values of p, q, n, m, k, $\alpha$ and $\alpha/n$ are in the ranges $0.0001 \leq p \leq 0.5$, $0.0001 \leq q \leq 0.5$, $0.5 \leq n \leq 3.0$, $0 \leq m \leq 0.5$, $0 \leq k \leq 0.2$, $0 \leq \alpha \leq 0.5$, and $0 \leq \alpha/n \leq 0.4$. M is at least one selected from a group of divalent metals including Mg; Q is a coactivator and at least one selected from a group including Mn, Zr, Nb, Pr, Nd, Gd, Tb, Dy, Ho, Er, Tm, Yb, and Lu; and X is at least one selected from halogen elements.

12 Claims, 2 Drawing Sheets

LAMP CONTAINING LONG DECAY PHOSPHOR

BACKGROUND OF THE INVENTION

The present invention relates to an afterglow lamp, the inner surface of which is coated with a boroaluminate long decay phosphor of a specified composition having afterglow characteristics.

An enforcement ordinance of the Fire Service Act, the Fire Prevention Regulations of each city or the like obliges people to provide guide lamps in places where many people gather, such as theaters and hotels. When usual electric sources are cut on account of an earthquake, a fire or other disasters, it is necessary that reserve electric sources are automatically put on to light such guide lamps for more than 20 minutes. However, if the reserve electric sources are also cut or feeding circuits are cut on account of the disaster, the guide lamps are cut off. In such cases, a complicated underground market, a long tunnel, a multistory building at night and the like become very dangerous places. Further, since the conventional guide lamps are of complicated structure, it takes much time and high cost to provide the same. Therefore, such guide lamps are rarely provided except the places where the Laws oblige to equip the same.

Further, guide lamps are required not only in an emerbency such as mentioned above. If almost all buildings, including large buildings such as company buildings, department stores, school houses and factories, and stores and houses, are equipped with guide lamps of simple structure and low cost which allow the users to see their feet from the time when they turn off the switches of the lights of a room, corridor or staircase, until they reach the exit, they will be more safe and comfortable.

In this connection, providing a light storing substance capable of absorbing and storing optical energy emitted from a light source on a supporting member, such as a shade positioned in a place where the light from the light source reaches has been disclosed in Japanese Non-examined Patent Publication No.58-121088 issued Jul. 19,1983. By using this light storing substance, it becomes unnecessary to provide reserve electric sources. However, the conventional light storing substances are disadvantageous in that they are chemically unstable and are apt to be deteriorated by ultraviolet rays, high temperatures, moisture or the like. Further, the afterglow of these light storing substances is dark and short. Furthermore, sufficient light cannot be obtained by the method of coating a supporting member with a light storing substance.

SUMMARY OF THE INVENTION

An object of the present invention is to provide a guide lamp which enables users to have a long and light afterglow, and requires neither any reserve electric source, even in an emergency, nor any special illuminator, for example one coated with a light storing substance.

The inventor, after studies, has found that the abovementioned object can be realized by coating the inner or outer surface of a guide lamp with an aluminate fluorescent substance of a specified composition, and has thus arrived at the present invention.

An afterglow lamp according to the present invention comprises a light emitting section for converting electric energy into optical energy, and a light transmittable glass for covering the light emitting section. A fluorescent substance layer is provided on at least one of the inner surface and the outer surface of the light transmittable glass.

The fluorescent substance layer is characterized by comprising a long decay phosphor represented by the general formula:

$$(M_{1-p-q}Eu_pQ_q)O \cdot n(Al_{1-m}B_m)_2O_3 \cdot kP_2O_5 \cdot \alpha X$$

in which the values of p, q, n, m, k, α, and α/n are in the ranges:
$0.0001 \leq p \leq 0.5$
$0.0001 \leq q \leq 0.5$
$0.5 \leq n \leq 3.0$
$0 \leq m \leq 0.5$
$0 \leq k \leq 0.2$
$0 \leq \alpha \leq 0.5$
$0 \leq \alpha/n \leq 0.4$;

M is at least one selected from a group of divalent metals consisting of Mg, Ca, Sr, Ba and Zn;

Q is a coactivator which is at least one selected from a group consisting of Mn, Zr, Nb, Pr, Nd, Gd, Tb, Dy, Ho, Er, Tm, Yb and Lu; and X is at least one selected from a group of halogen elements consisting of F, Cl, Br and I.

By further controlling the abovementioned composition in the following specified ranges, the fluorescent color and the afterglow color can be selected. In order to prepare green light emitting long decay phosphors having a light emission peak wavelength near 520 nm, the following composition range is selected. Thus, in a boroaluminate fluorescent substance activated by a divalent europium, a long decay phosphor is selected which is represented by the following chemical composition formula in the following composition range and the main component of the crystalline structure of which is a monoclinic system:

$$(M_{1-p-q}Eu_pQ_q)O \cdot n(Al_{1-m}B_m)_2O_3 \cdot kP_2O_5 \cdot \alpha X$$

$0.0001 \leq p \leq 0.5$
$0.0001 \leq q \leq 0.5$
$0.5 \leq n < 1.5$
$0.0001 \leq m \leq 0.5$
$0 \leq k \leq 0.2$
$0 \leq \alpha \leq 0.5$
$0 \leq \alpha/n \leq 0.4$ in which more than 70 mol % of M is Sr.

In order to prepare a blue light emitting afterglow fluorescent substance having a light emission peak wavelength near 440 nm, the following composition range is selected. Thus, in a boroaluminate fluorescent substance activated by a divalent europium, a long decay phosphor is selected which is represented by the following chemical composition formula in the following composition range and the main component of the crystalline structure of which is a monoclinic system:

$$(M_{1-p-q}Eu_pQ_q)O \cdot n(Al_{1-m}B_m)_2O_3 \cdot kP_2O_5 \cdot \alpha X$$

$0.0001 \leq p \leq 0.5$
$0.0001 \leq q \leq 0.5$
$0.5 \leq n < 1.5$
$0.0001 \leq m \leq 0.5$
$0 \leq k \leq 0.2$
$0 \leq \alpha \leq 0.5$
$0 \leq \alpha/n \leq 0.4$ in which more than 70 mol % of M is Ca.

In order to prepare a blue-green light emitting afterglow fluorescent substance having a light emission peak wavelength near 490 nm, the following composition range is selected. Thus, in a boroaluminate fluorescent substance activated by a divalent europium, a long decay phosphor is selected which is represented by the following chemical composition range and the main component of the crystalline structure of which is a rhombic system:

$(M_{1-p-q}Eu_pQ_q)O \cdot n(Al_{1-m}B_m)_2O_3 \cdot kP_2O_5 \cdot \alpha X$ $0.0001 \leq p \leq 0.5$
$0.0001 \leq q \leq 0.5$
$1.5 \leq n \leq 3.0$
$0.0001 \leq m \leq 0.5$
$0 \leq k \leq 0.2$
$0 \leq \alpha \leq 0.5$
$0 \leq \alpha/n \leq 0.4$ in which 70 mol % M is Sr.

This fluorescent substance, the main component of the crystalline structure of which is a rhombic system, is excellent especially in heat resistance. Therefore, if this fluorescent substance is used for a fluorescent lamp requiring a step of heating the fluorescent substance, it is advantageous that lowerings of the light emitting brightness degree and the afterglow brightness degree thereof can be reduced. In order to prepare a blue green light emitting long decay phosphor having a light emission peak wavelength near 490 nm, selecting the following composition range is especially preferable in respects of the light emitting brightness degree, the afterglow brightness degree and the heat resistance. Thus, in a boroaluminate fluorescent substance, activated by a divalent europium, a long decay phosphor is selected which is represented by the following chemical composition formula in the following composition range and the main component of the crystalline structure of which is a rhombic system:

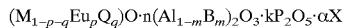

$(M_{1-p-q}Eu_pQ_q)O \cdot n(Al_{1-m}B_m)_2O_3 \cdot kP_2O_5 \cdot \alpha X$ $0.0001 \leq p \leq 0.5$
$0.0001 \leq q \leq 0.5$
$1.7 \leq n \leq 2.0$
$0.0001 \leq m \leq 0.5$
$0 \leq k \leq 0.2$
$0 \leq \alpha \leq 0.5$
$0 \leq \alpha/n \leq 0.4$ in which M is Sr.

An afterglow lamp according to the present invention can provide a long and bright afterglow without using any emergency reserve electric source.

Especially when a blue-green light emitting long decay phosphor, the crystalline structure of which is a rhombic system, is selected, the afterglow brightness degree thereof becomes remarkably high, and further, since the water resistance of the fluorescent substance is also improved, it can be applied to a lamp in which the long decay phosphor is in direct contact with the outer air.

It is very economical to apply this afterglow fluorescent lamp to a guide lamp, because the conventional illuminating lamp can be used as it is without providing any special illuminating lamp, for example, one coated with a light storing substance. As a result, the costs associated with choosing the places where the guide lamps are provided can be decreased.

Further, when this afterglow fluorescent lamp is incorporated in a conventional guide lamp provided with a reserve electric source and used, it ensures a very reliable guide lamp since it can function as a guide lamp even if the reserve electric source or the feeding circuit is cut in an emergency.

In addition, this afterglow fluorescent lamp can be used as an emergency guide lamp furnished in a room, corridor or staircase for illuminating one's feet after one has switched off the main light until one reaches an exit, because this afterglow lamp can provide an afterglow of a high brightness degree even after the switch is cut.

BRIEF DESCRIPTION OF THE DRAWINGS

The above and further object and features of the present invention will more fully be apparent from the following detailed description given with accompanying drawings.

DETAILED DESCRIPTION OF THE INVENTION

An afterglow lamp is coated with long decay phosphors. In this afterglow lamp, the long decay phosphor is designed to receive the light emitted from the lamp. The long decay phosphor is excited by the light emitted from the lamp and emits afterglow light. The light of the lamp capable of exciting the long decay phosphor varies according to the chemical composition of the long decay phosphor as above-mentioned.

Figure 1:
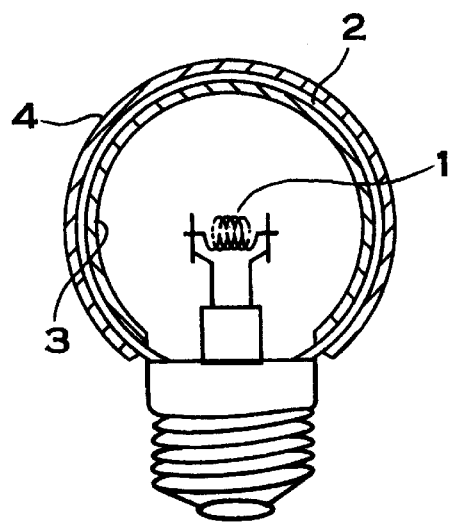
FIG. 1 is a sectional view of an afterglow lamp according to the present invention.

The long decay phosphor of the present invention can be used for many kinds of lamps. The long decay phosphor of the present invention can be applied to all kinds of lamps now in practical use, such as incandescent lamps, fluorescent lamps, HID lamps and halogen lamps. An afterglow lamp of the present invention can be obtained by coating the long decay phosphor on the inner surface and/or outer surface of a light transmittable glass 2 covering a light emitting section 1 of the lamp and thereby forming an inner fluorescent layer 3 and/or the outer fluorescent layer 4 as shown in FIG. 1.

The thickness of the long decay phosphor layer varies according to the particle size of the long decay phosphor used, but 5 to 100 μm is preferable. If the thickness of the long decay phosphor layer is smaller than this range, the amount of the applied long decay phosphor is too small, and afterglow can hardly be provided. When the thickness is larger than this range, on the contrary, the light emitted from the lamp is intercepted by the long decay phosphor, and the original function of the lamp as an illuminator is lowered.

All the afterglow lamps according to the present invention are designed as mentioned above. However, especially in a fluorescent lamp, the fluorescent substance of the fluorescent layer on the inner surface of the glass tube is excited by ultraviolet rays and emits light. Therefore, the ultraviolet rays can be directly utilized. When the long decay phosphor is applied on the inner surface of the glass tube of a fluorescent lamp, the long decay phosphor is directly excited also by 253.7 nm mercury rays radiated from a positive column that is a light emitting section of the fluorescent lamp. Consequently, an afterglow fluorescent lamp can be obtained by applying only the long decay phosphor on the fluorescent lamp. In this case, the afterglow becomes extremely bright. However, since the lamp is usually used as a usual white light fluorescent lamp, preferably the long decay phosphor is used in combination with a fluorescent substance for a fluorescent lamp so that the long decay phosphor can receive the light of the fluorescent substance for the fluorescent lamp and thereby emit afterglow.

Figure 2:
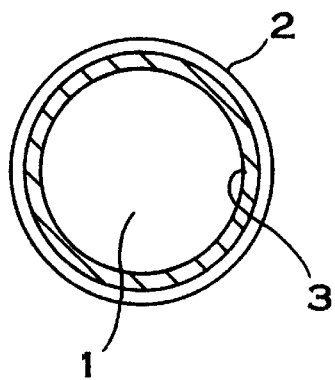
FIG. 2 is a sectional view of an afterglow lamp according to the present invention.

An embodiment of an afterglow fluorescent lamp according to the present invention in which the long decay phosphor receives light of another fluorescent substance will now be explained with reference to a sectional view of FIG. 2 in which a fluorescent lamp is sectioned perpendicularly to the longitudinal direction of its tube. A fluorescent substance layer 3 formed on the inner surface of a light transmittable glass 2 is excited by optical energy (ultraviolet ray radiating energy) converted from electric energy mainly in the light emitting section 1 of a positive column. In this case, the long decay phosphor and the illuminating fluorescent substance capable of exciting the long decay phosphor may be mixed in the fluorescent layer, and this method is most easily carried out.

Figure 3:
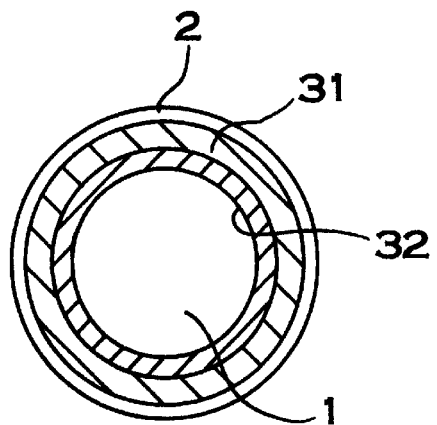
FIG. 3 is a sectional view of an afterglow lamp according to the present invention.

Further, as shown in a sectional view of a fluorescent lamp of FIG. 3, what is called a two layer application may be chosen, in which a first layer on the inner surface of the light transmittable glass is formed as a long decay phosphor layer 31, with a second layer 32 being formed as an illuminating fluorescent substance layer. According to this method, 253.7 nm mercury rays are used for exciting the illuminating fluorescent substance. Ultraviolet rays which are not used for exciting the illuminating fluorescent substance but transmitted through the illuminating fluorescent substance layer reach the long decay phosphor layer and excite the long decay phosphor. In addition, visible light emitted from the illuminating fluorescent substance layer reaches the long decay phosphor layer and is used for exciting the long decay phosphor. In this case, the long decay phosphor is excited by both the ultraviolet rays and the visible light, and the obtained afterglow lamp is a high brightness degree illuminating lamp, and the obtained afterglow is also of a high brightness degree.

Figure 4:
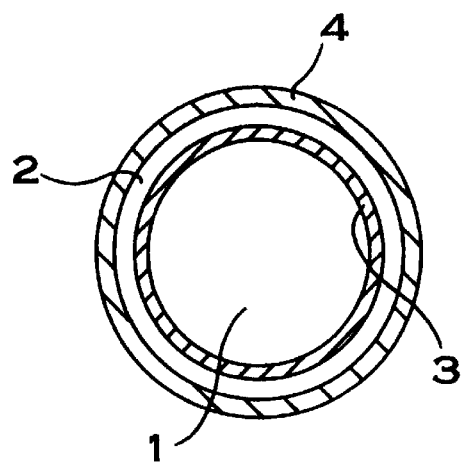
FIG. 4 is a sectional view of an afterglow lamp according to the present invention.

Furthermore, as shown in a sectional view of the fluorescent lamp of FIG. 4, It is possible that an illuminating fluorescent substance layer 3 is formed on the inner surface of a light transmittable glass 2 with a long decay phosphor layer 4 being formed on the outer surface thereof.

As the fluorescent substance included in the abovementioned fluorescent substance layer, in a mixed state and used with the long decay phosphor, applicable are fluorescent substances usually usable as illuminating fluorescent substances, for example, $(SrCaBaMg)_5(PO_4)_3Cl:Eu$, $BaMg_2Al_{16}O_{27}:Eu$, $Sr_5(PO_4)_3Cl:Eu$, $LaPO_4:Ce$, Tb, $MgAl_{11}O_{19}:Ce$, Tb, $Y_2O_3:Eu$, $Y(PV)O_4:Eu$, $3.5MgO \cdot 0.5MgF_2 \cdot GeO_2:Mn$, $Ca_{10}(PO_4)_6FCl:Sb$, Mn, $Sr_{10}(PO_4)_6FCl:Sb$, Mn, $(SrMg)_2P_2O_7:Eu$, $Sr_2P_2O_7:Eu$, $CaWO_4$, $CaWO_4:Pb$, $MgWO_4$, $(BaCa)_5(PO_4)_3Cl:Eu$, $Sr_4Al_{14}O_{25}:Eu$, $Zn_2SiO_4:Mn$, $BaSi_2O_5:Pb$, $SrB_4O_7:Eu$, $(CaZn)_3(PO_4)_2:Tl$, and $LaPO_4:Ce$.

Red color fluorescent substances which emit light mainly of more than 600 nm wavelength are not used for exciting the long decay phosphor. This is because fluorescent substances of such long wavelengths cannot excite the long decay phosphor. However, the usual illuminating fluorescent lamps often emit light throughout the visible range, and therefore when such fluorescent lamps are provided with afterglow characteristics, red color light is not necessary for the long decay phosphor, but is necessary for setting the light color of the fluorescent lamp in a required range. As the fluorescent substance, most preferable is a three wavelength fluorescent mixture consisting of a blue light emitting fluorescent substance having a light emission peak wavelength near 450 nm, a green light emitting fluorescent substance having a light emission peak wavelength near 545 nm and a red light emitting fluorescent substance having a light emission peak wavelength near 610 nm in the respects that this fluorescent mixture can highly excite the long decay phosphors, can emit light in the white color range as an illuminating fluorescent lamp, and can freely change the light color of the fluorescent lamp. As the blue light emitting fluorescent substance, $(SrCaBaMg)_5(PO_4)_3Cl:Eu$ and $BaMg_2Al_{16}O_{27}:Eu$ can be preferably used. As the green light emitting fluorescent substance, $LaPO_4:Ce$, Tb, and $MgAl_{11}O_{19}:Ce$, Tb fluorescent substances can be preferably used. And as the red light emitting fluorescent substance, $Y_2O_3:Eu$ can be preferably used.

The mixing ratio of the long decay phosphor constituting the fluorescent substance layer and the fluorescent substance for the fluorescent lamp which is mixed therewith can be freely changed according to the purpose of the lamp. For example, when use as an illuminating fluorescent lamp has priority, and thus the luminous flux of the lamp is most important, the proportion of the fluorescent substance for the fluorescent lamp is increased. On the contrary, when brightness and a long afterglow is required, it can be realized by increasing the proportion of the long decay phosphor.

Further, for manufacturing an afterglow fluorescent lamp, a usual method for manufacturing fluorescent lamps can be applied. For example, a long decay phosphor, a fluorescent substance which is put together with the long decay phosphor for exciting the same, and a binding agent such as alumina, calcium pyrophosphate or calcium barium borate are added to a nitro cellulose/butyl acetate solution, mixed and suspended to prepare a fluorescent substance coating suspension. The obtained fluorescent substance coating suspension is run on the inner surface of the glass tube of the fluorescent lamp, and thereafter dried by blowing hot air. Then, the fluorescent lamp can be completed according to the usual manufacturing steps including baking, air discharging, filament fitting, base attachment and the like.

At the time of coating the suspension on the inner surface of the tube, it is possible to first make a protecting layer of, e.g., alumina, a then form a fluorescent substance layer thereon. By using such a method, the light emitting qualities of the fluorescent lamp such as luminous flux and the luminous flux maintenance factor can be further improved.

Raw material of the long decay phosphor used for carrying out the present invention are metal oxides such as SrO, $Al_2O_3$ and $Eu_2O_3$, or compounds which can easily become oxides by firing at a high temperature such as $SrCO_3$. As such compounds, there are nitrates, oxalates and hydroxide, in addition to carbonates. Since the light emitting qualities depend on the purity of the material, the purity of these raw materials must be more than 99.9%, and preferably are more than 99.99%.

By adding halogen element as a flux to the long decay phosphor and heating the mixture, extraordinary particle growth of the long decay phosphor can be controlled and thereby crystal growth thereof can also be controlled. This is because the halogen element reacts with aluminum, alkaline earth metals and rare earth metals included in the long decay phosphor, ana the long decay phosphor with the reactant being mainly on the particle surfaces of the fluorescent substance is reacted, so that the particles of the long decay phosphor can be uniformly formed. As a result, the particle shape of the long decay phosphor as well as the dispersibility thereof can be improved.

As the halogen compound added as a flux to the raw materials of long decay phosphor at the time of heating, ammonium salts of halogen elements, halogenide of alkaline earth elements, aluminium halogenide or the like are used singly or as a mixture. Almost the whole of the added halogen element is contained in the resulting composition of the long decay phosphor. Therefore, by adding an amount of the halogen element such as is desired to be contained in the resulted long decay phosphor to the raw material and burning the mixture, the halogen content of the long decay phosphor can be controlled.

The halogen content $\alpha$ of the long decay phosphor depends upon the composition of the long decay phosphor. It depends especially upon the mol value n of boroaluminate in the composition formula of the long decay phosphor according to the present invention. With the value n being in the range more than 0.5 and less than 1.5, the emitted light of the long decay phosphor is green when the alkaline earth metal is Sr, and is blue when it is Ca, and the range of $\alpha$ is preferably more than 0.003 and less than 0.2, and more preferably is less than 0.05 and more than 0.12. Further, with the value n being in the range more than 1.5 and less than 3.0, the emitted light is blue-green, and the range of $\alpha$ is preferably more than 0.004 and less than 0.25 and more preferably is less than 0.08 and more than 0.15. Further, the value $\alpha/n$ is preferably more than 0.001 and less than 0.4 and most preferably near 0.07.

By putting boron into the composition of the long decay phosphor, the resultant boroaluminate can improve the crystalline characteristics, and can stabilize the luminescence center and the light trapping center, so that the brightness degree of the afterglow can be effectively increased.

In order to put boron into the composition of the long decay phosphor, it is effective to add a compound containing boron as a flux to the raw material and heat the same. As such a flux, boracic acid or borates of alkaline earth elements can be used, and especially boric acid is preferable. Almost the whole amount of the added boron is contained in the composition of the long decay phosphor.

In adding boron, the value m of the boron substituting aluminum is preferably in the range of more than 0.0001 and less than 0.5, and more preferably is near 0.05.

By adding specified amounts of boric acid and phosphoric acid to the raw material, almost the whole amount of the added boric acid together with alumina produces mixed crystal, and it is incorporated into the composition of the long decay phosphor so that heat resistance of the long decay phosphor can be improved. Excessive boric acid, together with phosphoric acid compounds and divalent metals, produces mixed crystal, which serves for preventing fusion between particles. This mixed crystal, being insoluble in water, covers particle surfaces of the long decay phosphor and therefore has water resistance. In order to put phosphoric acid into the composition of the long decay phosphor, preferably phosphoric acid, phosphoric anhydride, ammonium phosphate, phosphates of alkaline earth metals and the like are used. Almost the whole amount of phosphoric acid is contained in the resultant composition of the fluorescent substance. The phosphoric compound is added in such an amount that the phosphoric acid concentration k becomes preferably more than 0.001 and less than 0.2, more preferably more than 0.01 and less than 0.1, and most preferably more than 0.03 and less than 0.05.

The material comprising these components and the flux mixed together is subject to primary heating in the atmosphere at a temperature higher than 1200° C. and lower than 1600° C. for a few hours, and thereafter subject to a secondary heating in a weak reduction atmosphere at a temperature higher than 1200° C. and lower than 1600° C. By grinding and sieving the resultant formed substance, a long decay phosphor according to the present invention can be obtained. The mixing ratio of the components in the material, for the purpose of obtaining the objective long decay phosphor composition, is substantially equal to the theoretical ratio.

An activator and a coactivator put into the long decay phosphor relate to the fluorescent color and the afterglow brightness degree, and the concentration ranges of the activator and the coactivator agent are important for practical use. Therefore these concentrations are selected in the following ranges.

The concentration p of an activator Eu put into the long decay phosphor is preferably in a range higher than 0.001 and lower than 0.06.

As the coactivator, at least one selected from a group consisting Mn, Dy, Tm, Lu, Nb, Yb, Zr, Er, Pr, Ho and Nd can be used, but preferably two selected therefrom are used. The two elements can be regarded as a first and a second coactivator. As the first coactivator, mainly each of Dy, Nd, Pr, Ho and Er can be used. Especially when the divalent metal M is Sr, each of Dy, Pr, Tm, Ho and Er is effective for improving the afterglow brightness, and in this case the emitted light color is in the range from green to blue green. When the divalent metal M is mainly Ca, each of Nd and Tm is effective for improving the afterglow brightness, and in this case the emitted light color is in the range from blue to purplish blue. When the divalent metal M is mainly Ca, the combination of the first coactivator Nd and the second coactivator Mn can provide a highly efficient afterglow in the range of white color.

When Dy is selected as the first coactivator, the optimum range of the Dy concentration q for obtaining excellent light qualities is from 0.0005 to 0.03.

When Dy is selected as the first coactivator, the range of the concentration q of the second coactivator Mn is preferably from 0.0001 to 0.06, and more preferably from 0.0005 to 0.02.

When Dy is selected as the first coactivator, the range of the concentration q of the second coactivator Tm is preferably from 0.0003 to 0.02, and more preferably from 0.0004 to 0.01.

When Dy is selected as the first coactivator, the range of the concentration q of the second coactivator Lu is preferably from 0.0001 to 0.06, and more preferably from 0.0004 to 0.04.

When Dy is selected as the first coactivator, the range of the concentration q of the second coactivator Nb is preferably from 0.0001 to 0.08, and preferably from 0.0003 to 0.04.

When Dy is selected as the first coactivator, the range of the concentration q of the second coactivator Yb is preferably from 0.0002 to 0.04, and more preferably from 0.0003 to 0.01.

When Dy is selected as the first coactivator, the range of the concentration q of the second coactivator Zr is preferably from 0.002 to 0.70.

When Dy is selected as the first coactivator, the range of the concentration q of the second coactivator Er is preferably from 0.0001 to 0.03, and more preferably from 0.0005 to 0.02.

When Dy is selected as the first coactivator, the range of the concentration q of the second coactivator Pr is preferably from 0.0001 to 0.04, and more preferably from 0.0005 to 0.03.

When Nd is selected as the first coactivator, the optimum range of the concentration q of Nd is from 0.0005 to 0.03. In this case, the second coactivator may not necessarily be used at the same time.

When Nd is selected as the first coactivator, the range of the concentration q of the second coactivator Tm is preferably from 0.0001 to 0.06, and more preferably from 0.0005 to 0.02.

When Nd is selected as the first coactivator, the range of the concentration q of the second coactivator Pr is preferably from 0.0001 to 0.06, and more preferably from 0.0005 to 0.02.

When Nd selected as the first coactivator, the range of the concentration q of second coactivator Ho is preferably from 0.0001, to 0.06 and more preferably from 0.0005 to 0.02.

When Nd is selected as the first coactivator, the range of the concentration q of the second coactivator Dy is preferably from 0.0001 to 0.06, and more preferably from 0.0005 to 0.02.

As a long decay phosphor having a comparatively long time afterglow, a ZnS:Cu fluorescent substance has been conventionally known. However, if an afterglow lamp is manufactured with this long decay phosphor, the afterglow luminous flux is extremely low and a brightness that is usable for illumination cannot be obtained. This is because the ZnS:Cu fluorescent substance is optically decomposed by ultraviolet rays, so that zinc metal in a colloid state is deposited on the crystal surface of the fluorescent substance and changes the outer color of the fluorescent substance to black. As a result, the afterglow brightness of the fluorescent substance is remarkably lowered. Furthermore, at the baking step for burning the organic binder after the fluorescent substance applying step, the ZnS:Cu fluorescent substance is oxidized and ceases to emit light. From such fundamental reasons, this kind of fluorescent substance cannot be applied to a fluorescent lamp.

Unlike the conventional fluorescent substance, the abovementioned boroaluminate long decay phosphor used according to the present invention is not optically decomposed by ultraviolet rays. Besides, mercury adsorption by the fluorescent substance, which is one of the main causes of deterioration of a fluorescent lamp when it is on, as well as deterioration of the fluorescent substance by ion bombardment of $Ar^+$, $Hg^+$ and the like emitted from the positive column of the fluorescent lamp, hardly occur.

This boroaluminate long decay phosphor principally emits a bright afterglow by the effect of divalent Eu as an activator. The divalent Eu effects absorption in a wide range from visible light to ultraviolet rays, and like natural light, the boroaluminate long decay phosphor is excited in a wide wavelength range to highly efficiently emit light (fluorescent light). Further, by doping the long decay phosphor composition with at least one selected from a group consisting of Mn, Zr, Nb, Pr, Nd, Gd, Tb, Dy, Ho, Er, Tm, Yb and Lu, the afterglow phenomenon occurs.

According to the present invention, a boroaluminate fluorescent substance is used, which, because of containing boron, can improve the crystalline characteristics of the aluminate and stabilize the luminescence center and the trapping center, so that an improved afterglow time and afterglow brightness can be obtained.

When the ratio of the whole mol number of the oxides of the divalent metals, the activator and the coactivators and the whole mol number of the alumina and the boric acid is 1:1, namely n=1, it is proved through x-ray diffraction of the fluorescent substance that the crystalline structure is a monoclinic system of a $SrAl_2O_4$ type and the fluorescent substance emits green light having the light emission peak wavelength 520 nm.

When the abovementioned components and additives are mixed and heated with the mol number ratio being 1:2, namely n=2, with a low concentration about 1 mol % of boron substitution, $SrAl_4O_2$ which is the structure that ought to be produced from the composition of the material, is produced.

However, with a higher concentration of boron substitution, a mixture of an $Sr_4Al_{14}O_{25}$ structure and an $SrAl_{12}O_{19}$ structure is produced. An especially important one of these crystalline structures is the $Sr_4Al_{14}O_{25}$ structure, which belongs to a rhombic system. Since the long decay phosphor contains a predetermined amount of boron, the crystalline structure thereof is changed and the afterglow characteristics are improved. Especially when n is about 1.75, blue-green light having a light emission peak wavelength 490 nm is most strong, and as a result of X-ray diffraction, a high purity of a long decay phosphor having the $Sr_4Al_{14}O_{25}$ structure, which is expected from the amounts of the composition of the material, can be obtained. This long decay phosphor having the $Sr_4Al_{14}O_{25}$ structure is obtained in a range of $1.5 \leq n \leq 3.0$, and especially, it can be obtained as a main product in a range of $1.7 \leq n \leq 2.1$.

This long decay phosphor having a crystalline structure of a rhombic system is better in heat resistance than the fluorescent substance having crystalline structure of monoclinic system obtained in the range $0.5 \leq n \leq 1.5$. Therefore, this long decay phosphor can advantageously provide high afterglow characteristics when it is used in a lamp such as a fluorescent lamp in which the fluorescent layer is subject to baking at a high temperature in the manufacturing process. The heat resistance of this boroaluminate long decay phosphor is lowered as the boric acid content thereof increases. The formed product of this long decay phosphor is solid and therefore is hard to be treated in the following step of grinding, sieving and the like. However, by adding a phosphoric acid compound to the raw material composition, heat resistance and water resistance can be improved.

The most part of the added phosphoric acid produces a mixed crystal together with alumina and is incorporated into the long decay phosphor composition. However, it is regarded that the excessive phosphoric acid produces a mixed crystal together with the phosphoric compound and divalent metal and serves for preventing fusion between the long decay phosphor particles, thereby contributing to the improvement of the heat resistance. Further, since this mixed crystal, being insoluble in water, covers the particle surfaces of the long decay phosphor, it improves the water resistance of the long decay phosphor.

EXAMPLE 1

In this example, a case will be described in which green color light emitting long decay phosphor $(Sr_{0.955}EU_{0.03}DY_{0.015})O \cdot 0.91(Al_{0.95}B_{0.05})_2O_3 \cdot 0.03P_2O_5 \cdot 0.1F$ is excited and made to emit light by a three wavelength mixed fluorescent substance, and especially in which these fluorescent substance are fully mixed in the fluorescent layer of a fluorescent lamp.

As the raw material of a long decay phosphor, 140.98 g (0.955 mol) of $SrCO_3$, 88.14 g (0.865 mol) of $Al_2O_3$, 5.28 g (0.015 mol) of $Eu_2O_3$, 2.80 g (0.0075 mol) of $Dy_2O_3$, 5.63 g (0.091 mol) of $H_3BO_3$, 7.92 g (0.060 mol) of $(NH_4)_2HPO_4$ and 3.70 g (0.10 mol) of $NH_4F$ were put into a ceramic pot. Alumina balls as a mixing medium were added thereto, and the mixture was blended by a roller for 2 hours and a mixed raw material, before long decay phosphor is formed, (hereinafter referred to as material raw powder) was obtained. Then, the raw material powder was put into a boat-shaped crucible, and heated in a tubular furnace in the atmosphere at 1300° C. for 2 hours. Then, it was further heated for several hours with a flow of mixed gas consisting of nitrogen and hydrogen, and a formed product of the long decay phosphor was obtained. Thereafter, the burned product was ground and sieved through a 200 mesh screen, and a long decay phosphor obtained. This long decay phosphor shows emission of green light having a light emission peak wavelength 515 nm and a high spectral luminous efficacy.

The obtained long decay phosphor and a three wavelength mixed flourescent substance obtained by mixing 32% of $(SrCaBaMg)_5 (PO_4)_3Cl:Eu$ blue light emitting fluorescent substance having the light emission peak wavelength 453 nm, 18% of $LaPO_4:Ce$, Tb green light emitting fluorescent substance having the light emission peak wavelength 544 nm and 50% of $Y_2O_3:Eu$ red light emitting fluorescent substance having the light emission peak wavelength 611 nm were fully mixed in a ratio of 1:4. 20 g of the mixed fluorescent substance and 15 g of nitrocellulose/butyl binder were fully mixed in a ceramic pot to prepare a fluorescent substance coating slurry. This slurry was flowed into a glass tube to coat on the inner surface of the glass tube and dried with heated air, and thereby a fluorescent substance coated bulb was obtained. Then, the long decay phosphor applied bulb was subject to baking at 580° C. for 15 minutes, whereby a fluorescent layer was formed. The amount of the fluorescent substance coated on one fluorescent lamp was 5.0 g. Thereafter, steps of gas discharging, filament fitting and base attachment were carried out according to the conventional method, and a FL40SS fluorescent lamp was manufactured. Data of the obtained afterglow fluorescent lamp are shown in Table 1.

EXAMPLE 2

Two layer application will be now described in which $(Sr_{0.955}Eu_{0.03}Dy_{0.015})O \cdot 0.91(Al_{0.95}B_{0.05})_2O_3 \cdot 0.03P_2O_5 \cdot 0.1F$ long delay phosphor obtained in EXAMPLE 1 is coated as a first layer on a fluorescent lamp and the three wavelength mixed fluorescent substance is coated as a second layer thereon.

12 g of the fluorescent substance and 15 g nitrocellulose/butyl acetate binder were sufficiently mixed in a ceramic pot to prepare fluorescent substance coating slurry. This slurry is flowed into a glass tube to be coated on the inner surface of the glass tube and dried with heated air. The amount of the long decay phosphor thus formed as the first layer was 3 g. Then, 50 g of polyethylene oxide water solution was added to 30 g of a three wavelength mixed fluorescent substance obtained by mixing 34.7% of $(SrCaBaMg)_5(PO_4)_3:Cl:Eu$ blue light emitting fluorescent substance, 20.1% of $LaPO_4:Ce$, Tb green light emitting fluorescent substance and 45.2% of $Y_2O_3:Eu$ red light emitting fluorescent substance, and the mixture was sufficiently mixed in a ceramic pot to prepare a fluorescent substance coating slurry. This slurry was flowed into the glass tube to be applied on the inner surface of the tube and dried with heated air. The amount of the three wavelength mixed fluorescent substance thus formed as the second layer was 3 g. Then, the two layer coated bulb was subject to baking, at 580° C. for 15 minutes whereby a fluorescent substance layer was formed. Thereafter, steps of gas discharging, filament fitting and base attachment were carried out according to the conventional method, and a FL40SS fluorescent lamp was obtained. Data of the fluorescent lamp are shown in Table 1.

EXAMPLE 3

In this example, $(Ca_{0.955}Eu_{0.015}Nd_{0.03})O \cdot 0.97(Al_{0.95}B_{0.05})_2O_3 \cdot 0.03P_2O_5 \cdot 0.1F$ blue light emitting long decay phosphor is excited to emit light by a three wavelength mixed fluorescent substance, especially in a case in which these fluorescent substance are fully mixed in a fluorescent layer of a fluorescent lamp.

A long decay phosphor was prepared by the same method as described in EXAMPLE 1 except that as the material of the fluorescent substance, 95.59 g (0.955 mol) of $CaCO_3$, 94.01 g (0.922 mol) of $Al_2O_3$, 2.64 g (0.0075 mol) of $Eu_2O_3$, 5.05 g (0.015 mol) of $Nd_2O_3$, 6.00 g (0.097 mol) of $H_3BO_3$, 7.92 g (0.060 mol) of $(NH_4)_2HPO_4$ and 3.7 g (0.1 mol) of $NH_4F$ are used. This fluorescent substance showed blue light emission having the light emission peak wavelength 440 nm. The obtained long decay phosphor and a three wavelength mixed fluorescent substance obtained by mixing 17% of $(SrCaBaMg)_5 (PO_4)_3Cl:Eu$ blue light emitting fluorescent substance , 27% of $La PO_4:Ce$, Tb green light emitting fluorescent substance and 46% of $Y_2O_3:Eu$ red light emitting fluorescent substance are sufficiently mixed in the ratio of 1:4, and a FL40SS fluorescent lamp is obtained by the same method as described in EXAMPLE 1. Data of the obtained fluorescent lamp are shown in Table 1.

EXAMPLE 4

In this example, $(Sr_{0.970}Eu_{0.01}Dy_{0.02})O \cdot 1.78(Al_{0.986}B_{0.014})_2O_3 \cdot 0.03P_2O_5 \cdot 0.1F$ blue green light emitting long decay phosphor is excited to emit light by a three wavelength mixed fluorescent substance, especially in a case in which these fluorescent substances are fully mixed in a fluorescent layer of a fluorescent lamp.

As the raw materials of the long decay phosphor, 572.8 g (3.88 mol) of $SrCO_3$, 713.72 g (7.0 mol) of $Al_2O_3$, 7.04 g (0.02 mol) of $Eu_2O_3$, 14.92 g (0.04 mol) of $Dy_2O_3$, 12.4 g (0.2 mol) of $H_3BO_3$, 7.92 g (0.06 mol) of $(NH_4)_2HPO_4$ and 3.7 g (0.1 mol) of $NH_4F$ were used. Similar to EXAMPLE 1, these materials were put into a ceramic pot, provided with alumina balls as a mixing medium and mixed by a roller for 2 hours, so that a raw material powder was obtained. The raw material powder was put into a boat-shaped crucible, and heated in a tubular furnace in the atmosphere at 1300° C. for 2 hours. Then, it was further burned for several hours with a flow of mixed gas consisting of nitrogen and hydrogen, and a burned product of the fluorescent substance was obtained. Then the burned product was ground and sieving through a 200 mesh screen, and a long decay phosphor was prepared. The long decay phosphor shows emission of blue-green light a having light emission peak wavelength 490 nm.

The obtained long decay phosphor and three wavelength mixed fluorescent substance obtained by mixing 22.3% of $(SrCaBaMg)_5(PO_4)_3Cl:Eu$ blue light emitting fluorescent substance, 33.3% of $LaPO_4:Ce$, Tb green light emitting fluorescent substance and 44.4% of $Y_2O_3:Eu$ red light emitting fluorescent substances were sufficiently mixed in the ratio of 1:3. 20 g of this mixed fluorescent substance and 15 g of nitrocellulose/butyl acetate binder were sufficiently mixed in a ceramic pot to prepare a fluorescent substance coating slurry. This slurry was flowed into a glass tube to be coated on the inner surface of the glass tube and dried with heated air, and thereby a fluorescent substance bulb was obtained. Then, the fluorescent substance applied bulb was subject to baking at 580° C. for 15 minutes, whereby a fluorescent layer was formed. The amount of the fluorescent substance coated on one fluorescent lamp was 5.0 g. Thereafter, steps of gas discharging, filament fitting and base attachment were carried out according to the conventional method and a FL40SS aftergrow fluorescent lamp was obtained. Data of the afterglow fluorescent lamp are shown in table 1.

EXAMPLE 5

A two layer coating will be now described in which the $(Sr_{0.970}Eu_{0.01}Dy_{0.02}) \cdot 1.78(Al_{0.986}B_{0.014})_2O_3 \cdot 0.03P_2O_5 \cdot 01F$ long decay phosphor prepared in EXAMPLE 4 is coated as a first layer on a fluorescent lamp and a three wavelength mixed fluorescent substance is coated as a second layer thereon.

12 g of the long decay phosphor and 15 g of nitrocellulose/butyl acetate binder were sufficiently mixed in a ceramic pot to prepare a fluorescent substance coating slurry. This slurry is flowed into a glass tube to be coated on the inner surface of the glass tube and dried with heated air. The amount of the long decay phosphor thus coated as the first layer was 3 g. Then, 50 g of polyethylene oxide water solution was added to 30 g of a three wavelength mixed fluorescent substance of obtained by mixing 20.6% of $(SrCaBaMg)_5(PO_4)_3Cl:Eu$ blue light emitting fluorescent substance, 34.2% of $LaPO_4:Ce$, Tb green light emitting fluorescent substance and 45.2% of $Y_2O_3:Eu$ red light emitting fluorescent substance, and the mixture was sufficiently mixed in a ceramic pot to prepare a fluorescent substance coating slurry. This slurry was flowed into the glass tube to be coated on the inner surface of the glass tube and dried with heated air. The amount of the three wavelength mixed fluorescent substance thus coated as the second layer was 4 g. Then, the two layer coated bulb was subjected to baking at 580° C. for 15 minutes, whereby a fluorescent layer was formed. Thereafter, steps of gas discharging, filament fitting and base attachment were carried out according to the conventional method, and a FL40SS fluorescent lamp was obtained. Data of the obtained fluorescent lamp are shown in Table 1.

TABLE 1

| EXAMPLE | value X | value Y | Afterglow luminous flux lm |
|---|---|---|---|
| EXAMPLE 1 | 0.346 | 0.364 | 3545 |
| EXAMPLE 2 | 0.347 | 0.360 | 3350 |
| EXAMPLE 3 | 0.340 | 0.357 | 3271 |
| EXAMPLE 4 | 0.347 | 0.365 | 3557 |
| EXAMPLE 5 | 0.342 | 0.352 | 3402 |

Afterglow luminous flux measured immediately after putting off the light

As shown in this table, the fluorescent lamps made by way of experiment in the abovementloned EXAMPLES 1 to 5 had a luminous flux more than 3200 lm. As to the afterglow light flux 5 minutes after putting off the light, that of the fluorescent lamp of Example 4 was 335lm while that of the fluorescent lamp of Example 5 was 312 lm, which were both excellent values.

Since a long decay phosphor coated on a fluorescent lamp is baked in the process of manufacturing the fluorescent lamp, it is important that the long decay phosphor has excellent heat resistance. A long decay phosphor having excellent heat resistance shows excellent light emitting qualities in finished goods of fluorescent lamps. Further, the long decay phosphor is required to have excellent water resistance in accordance with its use purpose. In order to test the heat resistance and the water resistance of long decay phosphors, the long decay phosphors having the following compositions of EXAMPLES 6 to 22 were made by way of experiments. These long decay phosphors are made by the same method as used in EXAMPLE 1, except that the materials of the fluorescent substances were changed. The composition formulas of the long decay phosphor are shown in Table 2, while the phosphorescent brightness degrees thereof are shown Table 3.

TABLE 2 composition formula

6  $(Sr_{0.955}Eu_{0.03}Dy_{0.015})O.175(Al_{0.95}B_{0.05})_2O_3 \cdot 0.03P_2O_5$
7  $(Sr_{0.98}Eu_{0.005}Dy_{0.015})O.175(Al_{0.95}B_{0.05})_2O_3 \cdot 0.03P_2O_5$
8  $(Sr_{0.98}Eu_{0.005}Dy_{0.015}Pr_{0.003})O.1.75(Al_{0.95}B_{0.05})_2O_3 \cdot 0.03P_2O_5$
9  $(Sr_{0.98}Eu_{0.005}Dy_{0.015}Ho_{0.003})O.1.75(Al_{0.95}B_{0.05})_2O_3 \cdot 0.03P_2O_5$
10 $(Sr_{0.98}Eu_{0.005}Dy_{0.015}Tm_{0.003})O.1.75(Al_{0.95}B_{0.05})_2O_3 \cdot 0.03P_2O_5$
11 $(Sr_{0.98}Eu_{0.005}Dy_{0.015})O.1.80(Al_{0.95}B_{0.05})_2O_3 \cdot 0.03P_2O_5$
12 $(Sr_{0.98}Eu_{0.005}Ho_{0.015})O.1.75(Al_{0.95}B_{0.05})_2O_3 \cdot 0.03P_2O_5$
13 $(Sr_{0.98}Eu_{0.005}Pr_{0.015})O.1.75(Al_{0.95}B_{0.05})_2O_3 \cdot 0.03P_2O_5$
14 $(Sr_{0.955}Eu_{0.03}Dy_{0.015})O.0.91(Al_{0.95}B_{0.05})_2O_3 \cdot 0.03P_2O_5$
15 $(Sr_{0.955}Eu_{0.03}Dy_{0.015})O.0.91(Al_{0.95}B_{0.05})_2O_3$
16 $(Sr_{0.952}Eu_{0.03}Dy_{0.016}Tm_{0.003})O.0.91(Al_{0.95}B_{0.05})_2O_3 \cdot 0.03P_2O_5$
17 $(Sr_{0.952}Eu_{0.03}Dy_{0.015}Tm_{0.003})O.0.91(Al_{0.95}B_{0.05})_2O_3$
18 $(Sr_{0.952}Eu_{0.03}Dy_{0.015}Mn_{0.003})O.0.91(Al_{0.95}B_{0.05})_2O_3 \cdot 0.03P_2O_5$
19 $(Sr_{0.952}Eu_{0.03}Du_{0.015}Mn_{0.003})O.0.91(Al_{0.95}B_{0.05})_2O_3$
20 $(Sr_{0.955}Eu_{0.03}Dy_{0.015})O.0.97(Al_{0.95}B_{0.05})_2O_3 \cdot 0.01P_2O_5$
21 $(Sr_{0.955}Eu_{0.03}Dy_{0.015})O.0.85(Al_{0.95}B_{0.05})_2O_3 \cdot 0.05P_2O_5$
22 $(Sr_{0.955}Eu_{0.03}Dy_{0.015})O.0.76(Al_{0.95}B_{0.05})_2O_3 \cdot 0.08P_2O_5$

TABLE 3

| | value X/ value Y | phosphorescent brighness % (after 20 min.) | heat resistance (maintenance rate %) | water resistance (maintenance rate %) |
|---|---|---|---|---|
| 6  | 0.146/0.357 | 85.2 | 91.2 | 96.8 |
| 7  | 0.146/0.356 | 80.5 | 92.3 | 97.0 |
| 8  | 0.148/0.354 | 83.7 | 98.5 | 95.3 |
| 9  | 0.146/0.355 | 85.9 | 90.7 | 96.5 |
| 10 | 0.145/0.355 | 90.7 | 92.5 | 95.7 |
| 11 | 0.146/0.356 | 85.8 | 92.8 | 97.0 |
| 12 | 0.146/0.355 | 90.3 | 95.3 | 94.8 |
| 13 | 0.145/0.356 | 91.2 | 95.8 | 92.5 |
| 14 | 0.248/0.561 | 98  | 76.6 | 49.1 |
| 15 | 0.267/0.586 | 61  | 25.1 | 0    |
| 16 | 0.249/0.573 | 122 | 69.3 | 42.9 |
| 17 | 0.269/0.585 | 100 | 17.9 | 0    |
| 18 | 0.251/0.574 | 72  | 49.7 | 27.4 |
| 19 | 0.265/0.587 | 54  | 21.5 | 0    |
| 20 | 0.264/0.583 | 77  | 42.9 | 37.5 |
| 21 | 0.245/0.550 | 115 | 62.8 | 57.4 |
| 22 | 0.254/0.561 | 81  | 64.0 | 48.7 |

The heat resistances and the water resistances shown in Table 3 were calculated as follows. 10 g of each long decay phosphor was put into a quartz crucible, and was subject to oxidization in a muffle furnace at 600° C. for 30 minutes. The phosphorescent brightness of the product was measured. Then, the percentage of this phosphorescent brightness to the phosphorescent brightness of the long decay phosphor measured before being heated was calculated as the maintenance rate.

The water resistances shown in Table 3 were calculated as follows. 10 g of each long decay phosphor and 200 g of pure water were put into a plastic container, and rotated by a roller at a speed of 30 rpm for 72 hours. Then, the solid substance was separated from the liquid and dried. Thereafter, the phosphorescent brightness of the long decay phosphor was measured. Then the percentage of this phosphorescent brightness to the phosphorescent brightness of the long decay phosphor measured before contacting with water was calculated as the maintenance rate.

As shown in these Tables, the long decay phosphors consisting of boroaluminate fluorescent substances of EXAMPLES 6 to 13 having rhombic system crystalline structures with the value in the composition being more than 1.5 as the main component exhibited remarkably excellent heat resistance and water resistance in comparison with the boroaluminate fluorescent substances of EXAMPLES 14 to 22 having monoclinic system crystalline structures with the value n being near 1. Further, the boroaluminate fluorescent substances which, being provided with a phosphoric acid compound at the time of burning contained phosphoric acid in the composition, exhibited more excellent water resistance in comparison with the boroaluminate fluorescent substances of EXAMPLES 15, 17 and 19 which did not contain any phosphoric acid compound.

A fluorescent substance coated on the inner surface of a fluorescent lamp is subject to baking at about 600° C. in the process of manufacturing the lamp. A long decay phosphor having high heat resistance is especially useful for application to a fluorescent lamp and the like which are heated to a high temperature in the manufacturing process. Further, an afterglow fluorescent lamp having excellent water resistance is suitable for application to lamps which are put in direct contact with the outer air.

REFERENCE EXAMPLE 1

ZnS:Cu long decay phosphor selected as a long decay phosphor and a three wavelength mixed fluorescent substance obtained by mixing 34.1% of $(SrCaBaMg)_5(PO_4)_3Cl$:Eu blue light emitting fluorescent substance, 16.8% of $LaPO_4$:Ce, Tb green light emitting fluorescent substance and 49.1% of $Y_2O_3$:Eu red light emitting fluorescent substance were sufficiently mixed in the ratio of 1:3. And by the same method as used in EXAMPLE 1, a FL40SS fluorescent lamp was manufactured. The obtained fluorescent lamp was wholly blackish and had remarkably low lamp light flux. Therefore, this fluorescent lamp was unmarketable.

REFERENCE EXAMPLE 2

A two layer application will be now described in which a ZnS:Cu fluorescent substance selected similarly to REFERENCE EXAMPLE 1 is applied as a first layer on the inner surface of a fluorescent lamp, while a three wavelength mixed fluorescent substance is coated thereon as a second layer. 30 g of ZnS:Cu fluorescent substance and 15 g of nitrocellulose/butyl acetate binder were sufficiently mixed in a ceramic pot to prepare fluorescent substance application slurry. This slurry is flowed into a glass tube to be coated on the inner surface of the glass tube and dried with heated air. The amount of the long decay phosphor thus applied as the first layer was 3 g.

Then, 50 g of polyethylene oxide water solution was added to a three wavelength mixed fluorescent substance obtained by mixing 30.2% of $(SrCaBaMg)_5(PO_4)_3Cl$:Eu blue light emitting fluorescent substance, 29.4% of $LaPO_4$:Ce, Tb green light emitting fluorescent subatance and 40.4% of $Y_2O_3$:Eu red light emitting fluorescent substance. This mixture was sufficiently mixed in a ceramic pot to prepare fluorescent substance coating slurry. This slurry was flowed into the glass tube to be coated on the inner surface of the glass tube and dried with heated air. The amount of the three wavelength mixed fluorescent substance thus coated as the second layer was 3 g.

Thereafter, steps of gas discharging, filament fitting and base attachment were carried out according to the conventional method, and a FL40SS fluorescent lamp was manufactured. The obtained fluorescent lamp was wholly blackish and had remarkably low lamp luminous flux. Therefore, this fluorescent lamp was unmarketable.

As this invention may be embodied in several forms without departing from the spirit and essential characteristics thereof, the present embodiment is therefore illustrative and not restrictive, since the scope, of the invention is defined by the appended claims rather than by the description preceding them, and all changes that fall within metes and bounds of the claims, or equivalents of such metes and bounds thereof, are intended to be embraced by the claims.

What is claimed is:

1. An aftergrow lamp comprising a light emitting section for converting electric energy to optical energy, and a fluorescent layer which is excited to emit light by the light emitting section, and contains a long decay phosphor represented by the general formula

wherein the values of p, q, n, m, k, α and α/n are in the ranges
$0.0001 \leq p \leq 0.5$
$0.0001 \leq q \leq 0.5$
$0.5 \leq n \leq 3.0$
$0 \leq m \leq 0.5$
$0 \leq k \leq 0.2$
$0 \leq \alpha \leq 0.5$
$0 \leq \alpha/n \leq 0.4$; and M is at least one member selected from a group of divalent metals consisting of Mg, Ca, Sr and Ba;

Q is a coactivator and at least one member selected from a group consisting of Zr, Nb, Pr, Nd, Gd, Tb, Dy, Ho, Er, Tm, Yb and Lu; and X is at least one member selected from a group of halogen elements consisting of F, Cl, Br and I.

2. An aftergrow lamp as claimed in claim 1, in which the long decay phosphor contained in the fluorescent layer is represented by the general formula

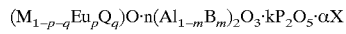

wherein the value of p, q, n, m, k, α, α/n, are in the ranges
$0.0001 \leq p \leq 0.5$
$0.0001 \leq q \leq 0.5$
$0.5 \leq n < 1.5$
$0.0001 \leq m \leq 0.5$
$0 \leq k \leq 0.2$
$0 \leq \alpha \leq 0.5$
$0 \leq \alpha/n \leq 0.4$; and
more than 70 mol % of M is Sr.

3. An aftergrow lamp as claimed in claim 1, in which the long decay phosphor contained in the fluorescent layer is represented by the general formula

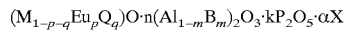

wherein the values of p, q, n, m, k, α and α/n are in the ranges
0.0001≦p≦0.5
0.0001≦q≦0.5
0.5≦n<1.5
0.0001≦m≦0.5
0≦k≦0.2
0≦α≦0.5
0≦α/n≦0.4; and
more than 70 mol % of M is Ca.

4. An aftergrow lamp as claimed in claim 1, in which the long decay phosphor contained in the fluorescent layer is represented by the following general formula, and the main component of the crystalline structure of the long decay phosphor is prismatic system

$(M_{1-p-q}Eu_pQ_q)O \cdot n(Al_{1-m}B_m)_2O_3 \cdot kP_2O_5 \cdot \alpha X$ wherein the values of p, q, n, m, k, α and α/n are in the ranges
0.0001≦p≦0.5
0.0001≦q≦0.5
1.5≦n≦3.0
0.0001≦m≦0.5
0≦k≦0.2
0≦α≦0.5
0≦α/n≦0.4; and
more than 70 mol % of M is Sr.

5. An aftergrow lamp as claimed in claim 4, in which the long decay phosphor contained the fluorescent layer is represented by the following general formula, and the main component of the crystalline structure of the long decay phosphor is a rhombic system

$(M_{1-p-q}Eu_pQ_q)O \cdot n(Al_{1-m}B_m)_2O_3 \cdot kP_2O_5 \cdot \alpha X$ wherein the values of p, q, n, m, k, α and α/n are in the ranges
0.0001≦p≦0.5
0.0001≦q≦0.5
1.7≦n≦2.0
0.0001≦m≦0.5
0≦k≦0.2
0≦α≦0.5
0≦α/n≦0.4; and
more than 70 mol % of M is Sr.

6. An aftergrow lamp as claimed in claim 1, in which the value k representing the phosphoric acid content in the general formula is in the range 0.001≦k≦0.2.

7. An aftergrow lamp as claimed in claim 1, in which the light emitting section is a fluorescent lamp, and the fluorescent layer is applied on the inner surface of the fluorescent lamp.

8. An aftergrow lamp as claimed in claim 7, in which the fluorescent layer of the fluorescent lamp includes a fluorescent substance exciting the long decay phosphor and the aftergrow lamp, and the color of the emitted light is in white color range.

9. An aftergrow lamp as claimed in claim 5, in which the light emitting section is a fluorescent lamp, and the fluorescent layer is applied on the inner surface of the fluorescent lamp.

10. An aftergrow lamp as claimed in claim 7, in which the fluorescent layer of the fluorescent lamp includes a fluorescent substance exciting the long decay phosphor and the aftergrow lamp, and the color of the emitted light is in white color range.

11. An aftergrow lamp as claimed in clam 10, in which the fluorescent layer includes at least one of the long decay phosphor and a three wavelength mixed fluorescent substance consisting of a blue light emitting fluorescent substance having light emission peak wavelength near 450 nm, a green light emitting fluorescent substance having light emission peak wavelength near 545 nm and a red light emitting fluorescent substance having light emission peak wavelength near 610 nm.

12. An aftergrow lamp as claimed in claim 7, in which the fluorescent substance of a long decay phosphor layer and an illuminating fluorescent layer, and the illuminating fluorescent layer is provided the long decay phosphor layer.

* * * * *